United States Patent [19]

Stouffer

[11] Patent Number: 4,694,992
[45] Date of Patent: Sep. 22, 1987

[54] NOVEL INERTANCE LOOP CONSTRUCTION FOR AIR SWEEP FLUIDIC OSCILLATOR

[75] Inventor: Ronald D. Stouffer, Silver Spring, Md.

[73] Assignee: Bowles Fluidics Corporation, Columbia, Md.

[21] Appl. No.: 748,065

[22] Filed: Jun. 24, 1985

[51] Int. Cl.$^4$ ............................................ B63H 25/46
[52] U.S. Cl. .................................. 239/265.23; 98/2.09
[58] Field of Search .......................... 98/2.09, 2.08, 2; 239/284, 265.19, 265.23, 102, 419.5, 265.17, DIG. 3, DIG. 7; 137/820, 835, 834, 826; 237/12.3 R

[56] References Cited

U.S. PATENT DOCUMENTS

| | | | |
|---|---|---|---|
| 3,402,727 | 9/1968 | Boothe | 137/81.5 |
| 3,745,906 | 6/1973 | Kakei et al. | 98/2.09 |
| 3,832,939 | 9/1974 | Kakei et al. | 98/2.09 |
| 3,926,373 | 12/1975 | Viets | 239/265.17 |
| 4,231,519 | 11/1980 | Bauer | 239/589 |
| 4,407,186 | 10/1983 | Izumi et al. | 98/2 |
| 4,517,881 | 5/1985 | Stouffer | 98/2.08 |

FOREIGN PATENT DOCUMENTS

| | | | |
|---|---|---|---|
| 2819656 | 5/1977 | Fed. Rep. of Germany | 239/589 |
| 108323 | 8/1979 | Japan | 239/589 |
| WO85/00783 | 2/1985 | PCT Int'l Appl. | 239/589 |

OTHER PUBLICATIONS

Considine, Van Nostrand's Scientific Encyclopedia Nov. 4, 1983, pp. 1233–1236.

Primary Examiner—Henry A. Bennet
Attorney, Agent, or Firm—Jim Zegeer

[57] ABSTRACT

A fluidic oscillator for issuing a sweeping jet of air has a continuous inertance loop which has a section passing through the power nozzle of the fluidic oscillator. The continuous inertance loop is essentially coplanar with the plane of the fluidic oscillator so the basic oscillator element can be two identical molded parts which snap fit together.

6 Claims, 6 Drawing Figures

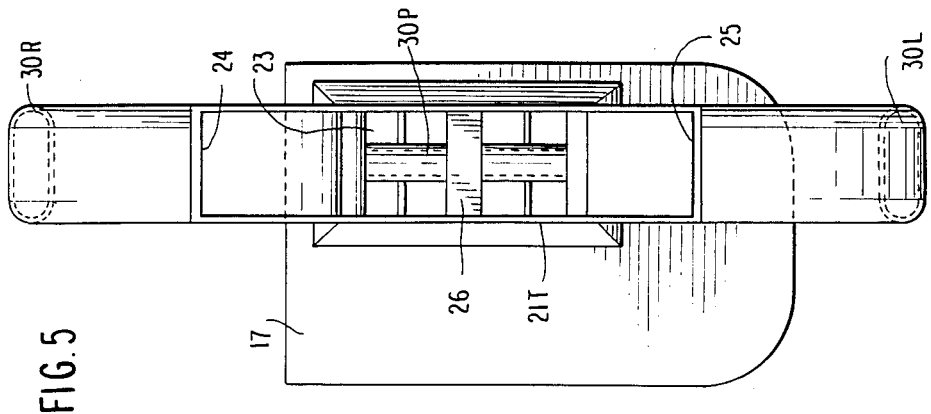
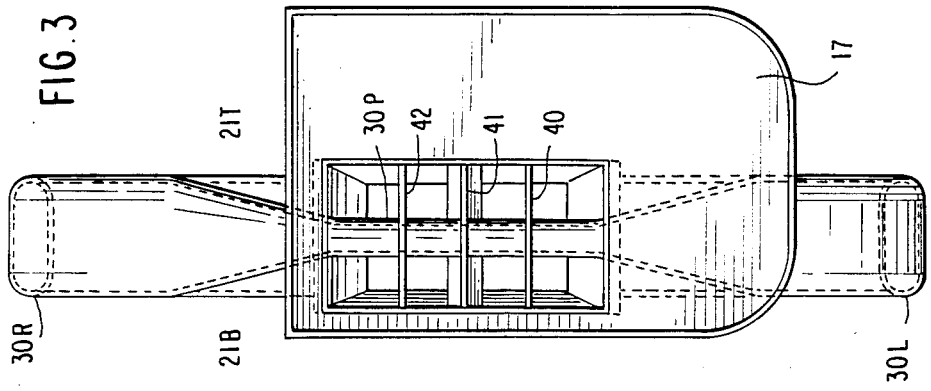
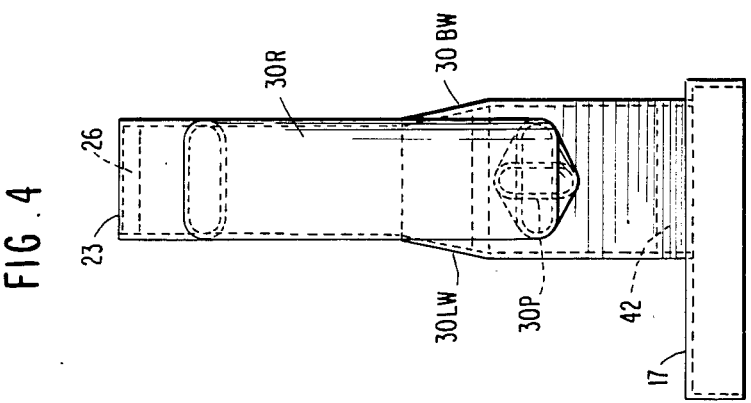

NOVEL INERTANCE LOOP CONSTRUCTION FOR AIR SWEEP FLUIDIC OSCILLATOR

REFERENCE TO RELATED APPLICATIONS

This application is related to Stouffer application Ser. No. 522,884 entitled "Vehicle Windshield Defrost Apparatus with Reduced Dashboard Space Requirements" and Boone et al. application Ser. No. 716,737 entitled "Air Sweep Defroster".

BACKGROUND OF THE INVENTION

The use of a sweeping jet fluidic oscillator for issuing a sweeping jet of air to, for example, clear the windshield of an automobile, is known in the art. In the above-identified related application of Stouffer, one embodiment utilizes a continuous inertance loop fluidic oscillator in which a cross-over type fluidic oscillator has a pair of converging sidewalls leading to a common outlet with the air jet issuing from a power nozzle being caused to shift from one side of the chamber to the other and issue in a sweeping fashion through the common outlet by virtue of the action of a continuous inertance loop connecting control ports at each side of the air jet at it issues from the power nozzle. In the above-identified related application of Boone et al., the oscillator portion is made relaively short and instead of a diverging converging cross-over type chamber fluidic oscillator element, the sidewalls of the interaction region diverge from each other to form a narrow, elongated slot to accomodate the sweeping angle of the oscillator. The pair of control ports immediately adjacent and downstream of the power nozzle are connected by continuous inertance loop with several different techniques utilized for accomodating the inertance loop which is of a length and cross-sectional area so as to assure that the frequency of oscillation is below about 12 kHz.

The present invention is an improvement on the fluidic oscillator disclosed in the above-identified related applications, and especially on the fluidic oscillator disclosed in the above related application of Boone et al.

It is an object of the invention to provide an improved inertance loop construction for fluidic oscillators; more particularly, an object of the invention is to provide an improved continuous inertance loop construction which results in a flatter fluidic element which is easier and less expensive to fabricate and provide a novel cross-over for the inertance loop between opposite sides of the element so that the fluidic element can be molded in two parts or halves. According to the invention, the loop is substantially coplanar with body of the oscillator with a portion of the inertance loop being formed as a passage which crosses through the power nozzle itself.

BRIEF DESCRIPTION OF THE DRAWINGS

The above and other objects, advantages and features of the invention will become more apparent when considered with the following specification and accompanying drawings wherein:

FIG. 3 is a bottom end view of the oscillator incorporating the invention, FIG. 4 is a side elevational view of a fluidic oscillator incorporating the invention, FIG. 5 is an outlet end view of the oscillators incorporating the invention.

DETAILED DESCRIPTION OF THE INVENTION

In general, fluidic oscillators according to the invention have an interaction region having an upstream end and a downstream end with a power nozzle for projecting a jet of air into the interaction region. First and second spaced apart control ports at each side of the upstream end of the interaction region and at each side of the jet of air projected into the interaction region by the power nozzle are connected together by a continuous inertance loop with the inertance loop being substantially coplanar with the oscillator end including a substantially flat or thin loop section or portion thereof extending transversely to the direction of air flow and preferably in the throat of the power nozzle. Substantial coplanarity of the inertance loop with the rest of the fluidic oscillator permits avoidance of molding and fabrication assembly problems, and achieves lower manufacturing costs. In the preferred embodiment the cross-sectional area of the power nozzle is enlarged to permit air flow therewith without pressure loss due to passage of the loop section through the power nozzle throat.

Figure 1:
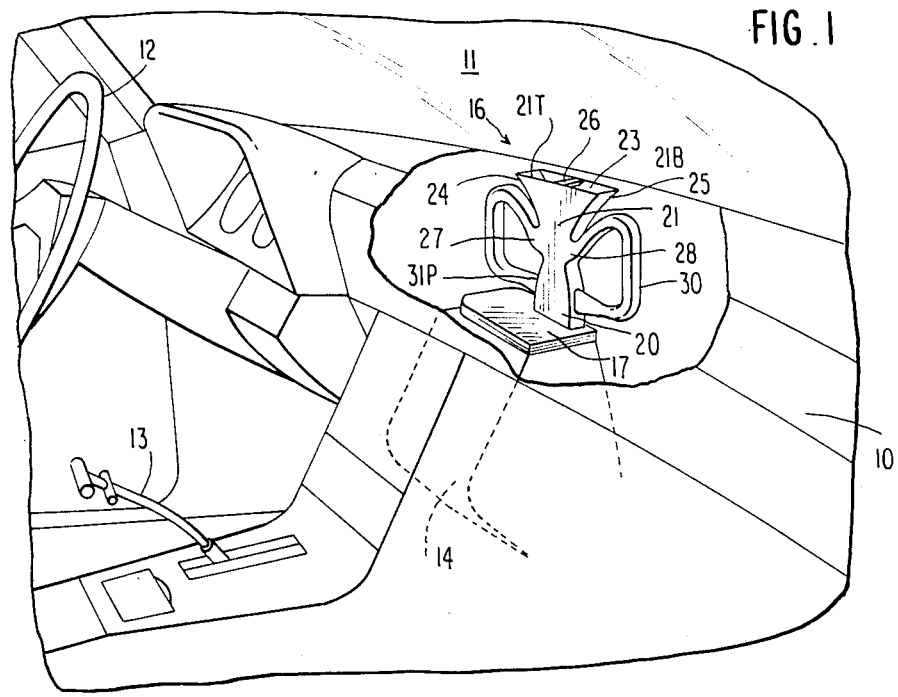
FIG. 1 is an isometric view of the front portion of an instrument panel showing the defrost/defog system incorporating the fluidic oscillator of the present invention.

Referring now to FIG. 1, the dashboard or instrument panel 10 of an automobile is adjacent the windscreen 11 and steering wheel 12 is on the driver's side and a gear shift 13 is positioned for convenient use by the driver. An air distributing plenum 14 receives windshield clearing air (for either defrosting and/or defogging) from the heat exchanger (not shown) and delivery to the windshield depending upon the position of a control (not shown) in a position to be easily operable and accessible by the driver and/or passenger, all of which is conventional and form no part of the present invention other than being a controlled source of defrost/defog air under pressure.

The abuting or mating edges E of each molded oscillator half is formed to be self-coupling and sealing whereby the edges are generally double "U" shaped with the legs of the "U" slightly inwardly inclined so that when the upper "U" portion of mold part is nested in the bottom "U", the spring in the legs of the outer "U" retain the two molded halves in assembly. While the two molded may also be retained in assembly by adhesive or by discrete fasteners, plenum mounting portion 17 is molded separately with the flow straighteners 40, 41, 42 and 43, it can be provided with a rim to snugly fit over the ends of the power nozzle halves 20T and 20B to serve as a retaining band therefor.

The fluidic defrost/defog nozzle 16 is connected to the plenum 14 by a coupling element 17. The fluidic oscillator itself includes a power nozzle 20, which is shown as having converging sidewalls 20L and 20R, for issuing a jet of air into an interaction region 21 that has an upstream end 21U coupled to the outlet 22 of power nozzle 20 and a downstream end 23 flush with an upper surface of instrument panel 12 and oriented to direct the stream of defrost/defog air upon the windscreen 11. The sidewalls 24, 25 bounding the interaction region diverge from each other in (this embodiment) and a flow divider 26 is positioned in the center of downstream end or outlet 23 of the fluidic oscillator. A pair of control ports 27, 28 at each side of the upstream end of the interaction region and just downstream of the power nozzle 20 are interconnected by inertance loop 30 which, according to the present invention is substantially coplanar with the plane of the fluidic oscillator and passes through an air flow path thereof.

A portion 31P of the inertance loop 30 passes through the throat 20T of power nozzle 20 and, in a preferred embodiment, as shown in the side elevational view of FIG. 4, the power nozzle is enlarged in cross-sectional area to accomodate the section 31P of the inertance loop crossing through the power nozzle. It will be appreciated that the term "cross-over" as used herein refers to the cross-over of the inertance loop 30 from one side to the other of the unit so as to properly interconnect the control ports 27, 28 with a continuous inertance loop. Thus, the term continuous inertance loop is intended to refer to the continuous passageway connecting the control ports 27 and 28.

Since the two halves of the inertance loop 30R and 30L are identical, only one half will be described in detail. Since the space downstream of the power nozzle opening 20PN is generally of uniform section with the top and bottom walls 21T and 21B of the interaction region 21 are, in this preferred embodiment, substantially uniformly spaced from the power nozzle throat 21PN to outlet 23, the openings or control ports 27 and 28 are generally rectangular. The sections of the flow path in inertance loops 30R are generally rectangular as is indicated with the section beginning at control port 28 gradually decreasing to about 0.30RT to constitute a transition or coupling section. The cross-sectional area of inertance loop half 30R is generally rectangular and uniform from about point 30RT to about point 30RP. From about point 30RP to the cross-over portion 31P the cross-sectional area remains essentially constant but gradually shifts from being flat in a vertical plane (of the paper of the drawing) to being flat or horizontal (in the plane of the drawing). That is to say, the sectional area of the inertance loop 30R between the point 30RP and 0.31P constitutes a transition section 31RTP which decreases in width (in the direction perpendicular to the sheet containing the paper) and increases in length (in a direction parallel to the plane of the paper). The section 31P is generally rectangular in section and essentially has the same section 30R except that the section is oriented orthogonally. Thus, the inertance loop transition section 31RTP changes the physical orientation of the flatness of the interance loop.

It will be appreciated that the inertance loop in sections 30R need not be square or rectangular but can in fact be circular, ovoidal, round or any other configuration but in the section 31P it is generally flat and rectangular or vane-like in the fashion indicated so as to reduce the cross-sectional area thereof as seen by the air flow from the plenum 14.

Figure 2:
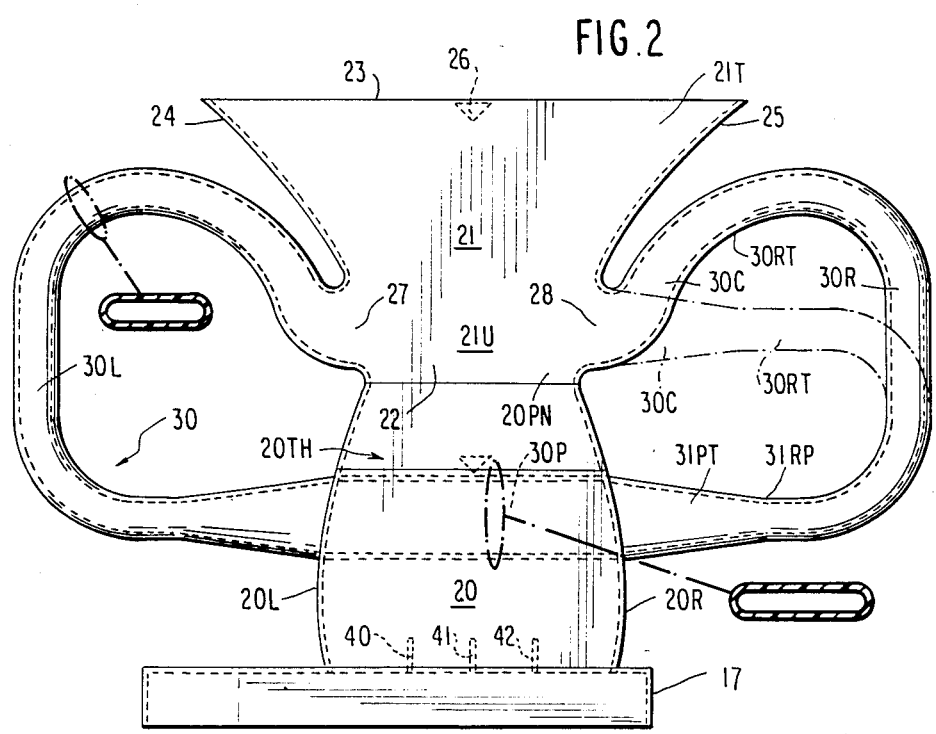
FIG. 2 is a top sectional view of a fluidic oscillator incorporating the invention.

As also shown in FIG. 2, one or more flow straighteners 40, 41, 42 are provided. The air flow from the blower and plenum to the fluidic oscillator itself is controlled by the channeling and duct work in the vehicle so these flow straighteners are utilized at the coupling of the oscillator to the plenum 14 and assure more uniform and symmetrical velocity profile of the airstream entering the power nozzle 20. In this respect, the inertance loop section 31P being relatively flat and streamlined to the air flow also serves a function as an air flow straightener transverse to the effect of the air flow straighteners 40, 41 and 42.

As noted above, the power nozzle is thickened to accomodate the thickness of section 30P of the inertance loop and tapers to the outlet 30PN by way of converting top and bottom walls 30TW and 30BW.

Figure 6:
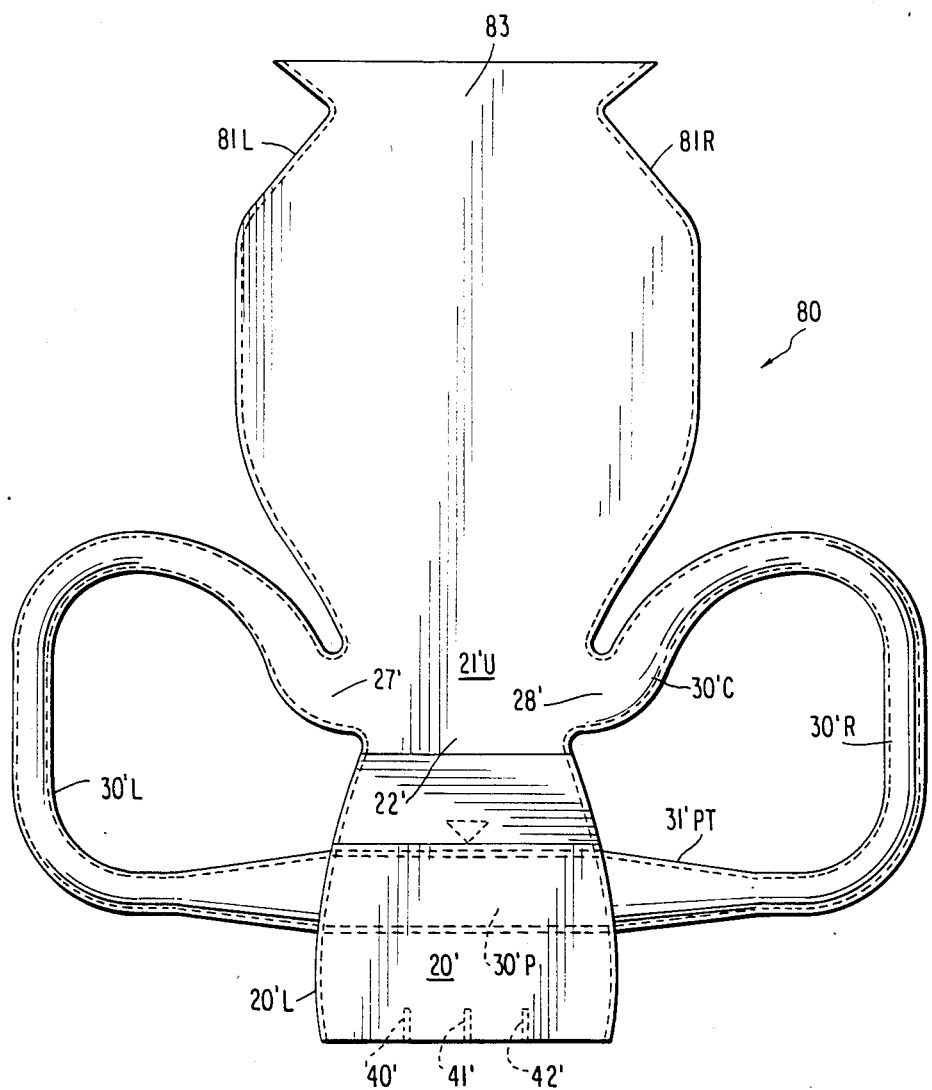
FIG. 6 is a plan view of a silhouette of an oscillator of the type disclosed in the above-identified related Stouffer application incorporating the present invention.

As shown in FIG. 6, the invention is not limited to fluidic oscillators of the type shown in FIGS. 1-4, but may also be included in any fluidic oscillator having a continuous inertance loop and there is a need to cross the continuous inertance loop from one side of the device to the other of the device. In this case, the fluidic oscillator 80 is of the cross-over type in which instead of diverging sidewalls, the sidewalls 81L and 81R of the interaction region or chamber converge to a common outlet 83 with the fluid flowing along the side walls exiting in an opposite direction through the common outlet. In addition, oscillation depends on different operating principle in that the dynamic compliance formed by the sidewalls converting to a common outlet has to be taken into account in conjunction with the action of the inertance loop.

While there has been shown and described preferred embodiments of the invention, it will be appreciated that the invention is capable of other modifications obvious to those skilled in the art and it is intended that such other obvious modifications be included within the spirit and scope of the claims appended hereto.

What is claimed is:

1. Continuous inertance loop connectable at its ends to a pair of control ports of a fluidic oscillator, comprising, a pair of matching sections, each of said matching sections having gradually varying cross-sectional areas for coupling the respective ends of said loop to said control ports, said matching section being of largest cross-sectional area at said control port, and of smaller cross-sectional area at the opposite end thereof, a pair of loop sections of uniform cross-sectional area substantially equal to the cross-sectional area of the said smaller cross-sectional area of the said opposite end of said matching section, each respective said loop section being connected at one end to said opposite end of its matching section, a pair of transition sections each having cross-sectional area substantially equal to the cross-sectional area of said loop sections of uniform cross-sectional area, and a common section having a substantially flat and elongated cross-sectional area and coupled between the respective ends of said transition sections.

2. In a fluidic oscillator having an interaction region having an upstream end and a downstream end, a power nozzle for projecting a jet of air into said interaction region, a first and second spaced apart oppositely facing control ports at each side of the upstream end of said interaction region and at each side of the jet of air projected into said interaction region by said power nozzle, and a continuous inertance loop made of rigid molded plastic interconnecting said control ports, the improvement wherein said continuous inertance loop being comprised of two plastic molded portions, each of which includes a portion of the following:

(1) a pair of matching sections having gradually varying cross-sectional areas for coupling said continuous inertance loop to said respective control ports, said matching sections being of largest cross-sectional area at said control port and of smaller cross-sectional area at the opposite end thereof, (2) a cross-over loop section which is substantially flat and elongated in cross-section and extends transversely of the direction of air flow in said power nozzle and has a pair of ends, and (3) coupler loop sections coupling the individual ones of said pair of ends to said opposite ends of said matching sections, respectively.

3. In a fluidic oscillator apparatus for issuing a sweeping jet of air to ambient, said fluidic oscillator apparatus including a power nozzle coupled to a supply of air under pressure, an interaction region receiving a jet of air from said power nozzle downstream of said power nozzle, a pair of control ports on opposite sides of said interaction region and an outlet for issuing said fluid to ambient and a continuous inertance loop interconnecting said control ports, the improvement comprising, the continuous inertance loop defined in claim 1.

4. The invention defined in claim 3 wherein said common section passes through said power nozzle, and the cross-sectional area of said power nozzle is increased a corresponding amount.

5. The fluidic oscillator defined in claim 2 wherein said coupler loop sections include:

(4) at least one uniform loop section of uniform cross-sectional area substantially equal to the cross-sectional area of said smaller cross-sectional area of the said opposite end of said matching sections.

6. The fluidic oscillator defined in claim 2 wherein said coupler loop sections includes a pair of uniform loop sections of uniform cross-sectional area substantially equal to the cross-sectional area of said smaller cross-sectional area of the said opposite end of said matching loop section, each respective uniform loop section being connected at one end to said opposite end of its respective matching loop section.

* * * * *